June 30, 1942.    H. GELLER    2,288,519
CASH REGISTER, ACCOUNTING, AND THE LIKE MACHINES
Filed July 26, 1937    5 Sheets-Sheet 1
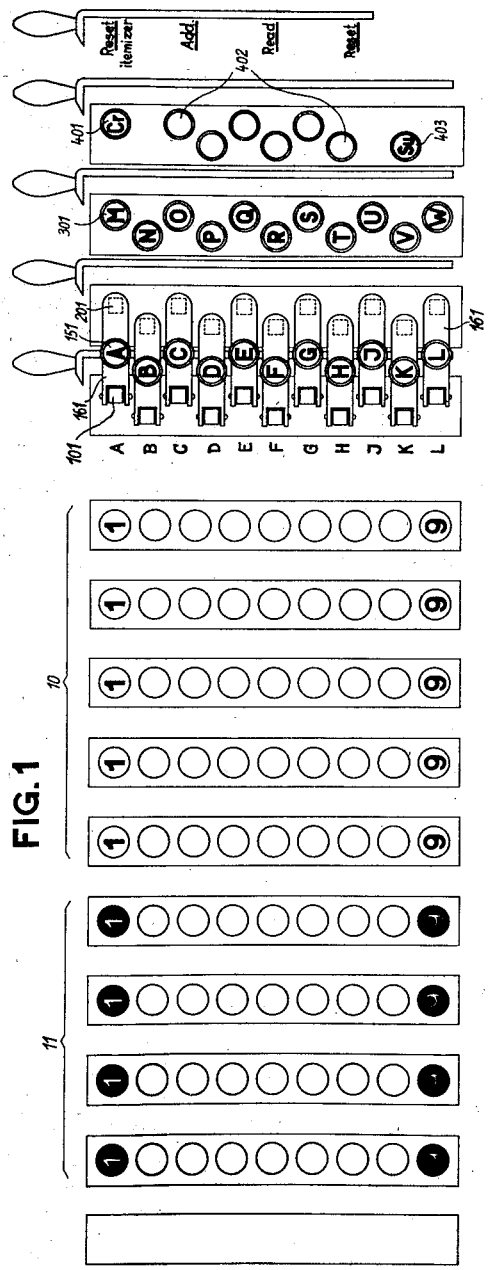
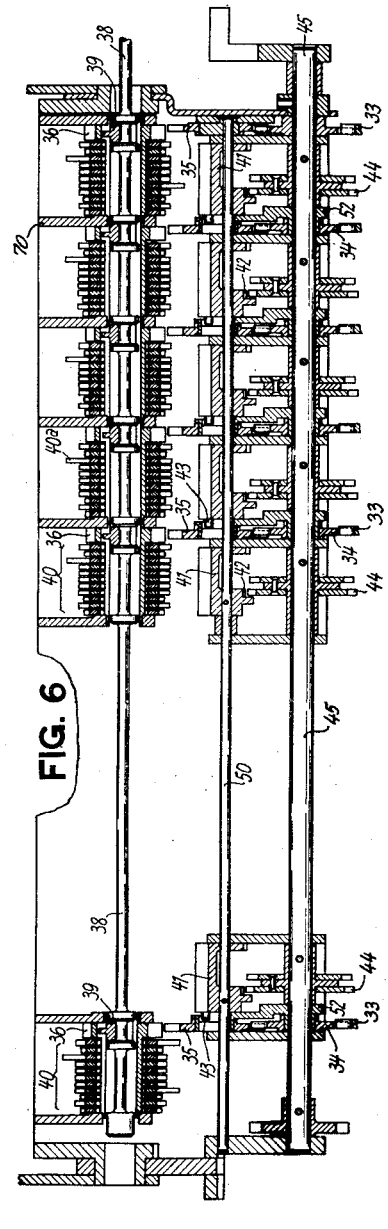
Inventor
Dr. Helmut Geller
By Karl Beust
His Attorney June 30, 1942. H. GELLER 2,288,519

CASH REGISTER, ACCOUNTING, AND THE LIKE MACHINES

Filed July 26, 1937 5 Sheets-Sheet 2

Inventor
Dr. Helmut Geller
By Earl Bernt
His Attorney

Inventor
Dr. Helmut Geller
By Carl Benst
His Attorney

June 30, 1942.  H. GELLER  2,288,519
CASH REGISTER, ACCOUNTING, AND THE LIKE MACHINES
Filed July 26, 1937  5 Sheets-Sheet 4
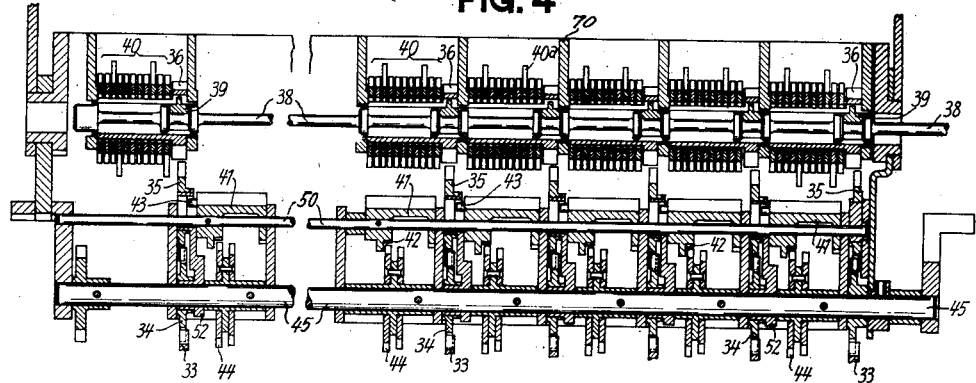
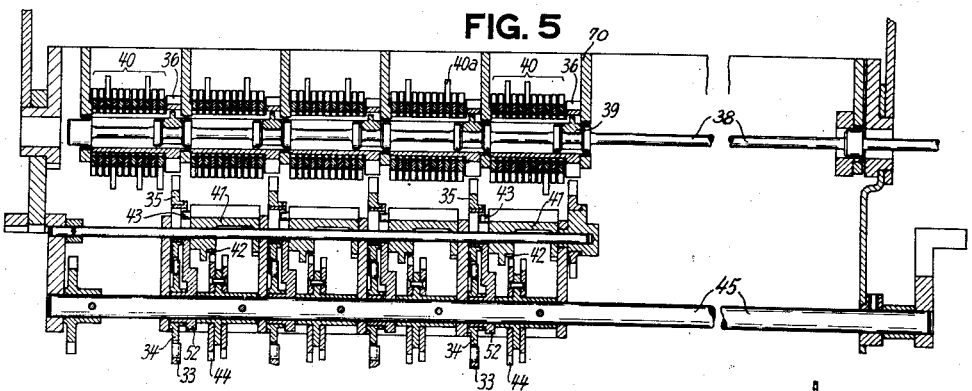
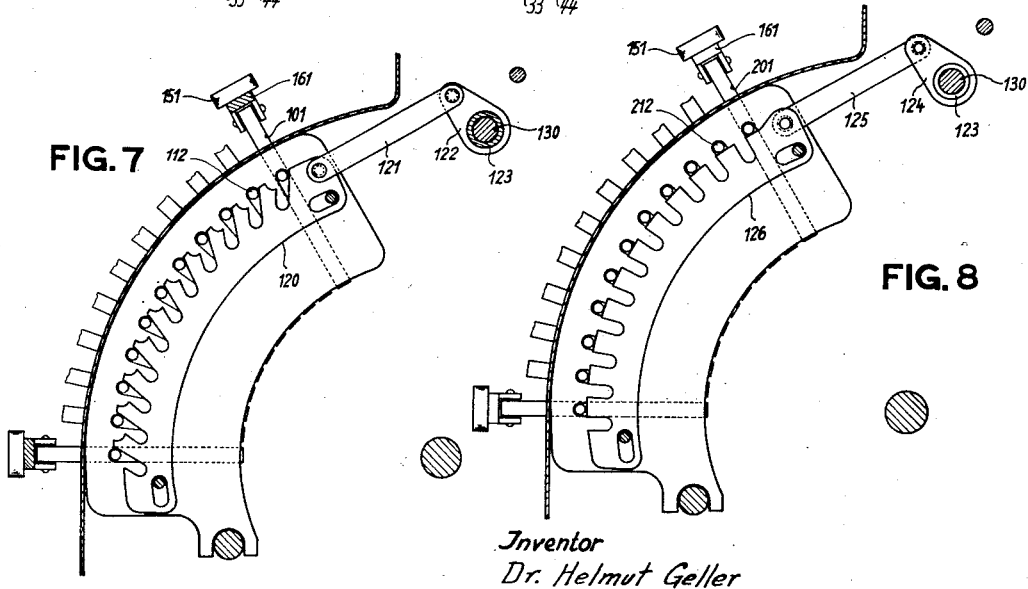
Inventor
Dr. Helmut Geller
By Pearl Bennett
His Attorney

FIG. 9.
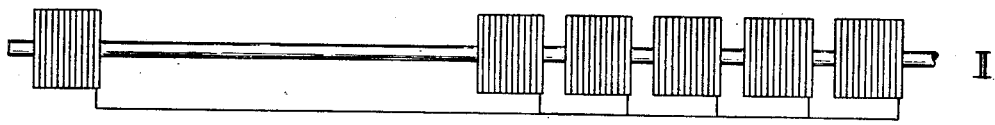 II
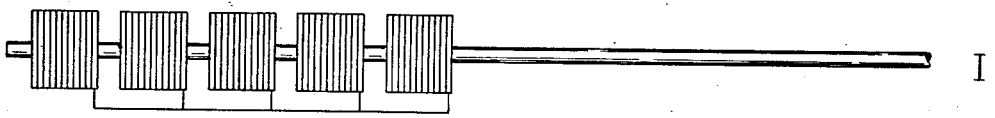 I
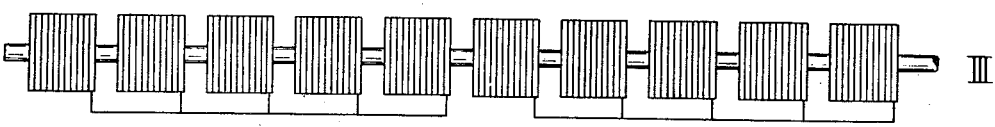 III
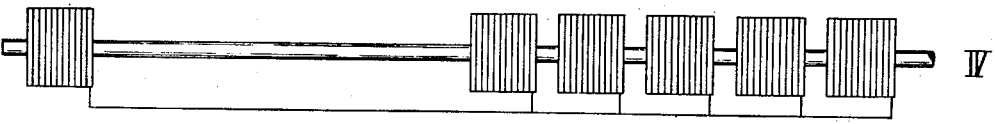 IV
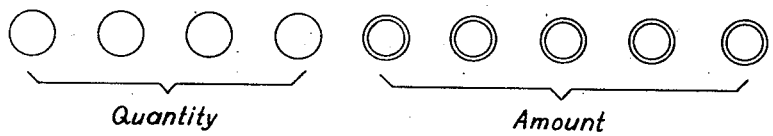
Quantity    Amount
FIG. 10.
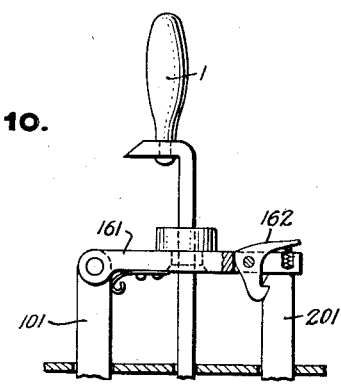

Patented June 30, 1942

2,288,519

UNITED STATES PATENT OFFICE 2,288,519

CASH REGISTER, ACCOUNTING, AND THE LIKE MACHINE

Helmut Geller, Berlin-Charlottenburg, Germany, assignor to The National Cash Register Company, Dayton, Ohio, a corporation of Maryland Application July 26, 1937, Serial No. 155,594
In Germany September 25, 1936

6 Claims. (Cl. 235—6)

This invention relates to cash registers, accounting and the like machines of the type having several rows of interspersed totalizers and more particularly to that class having a split key board and totalizers to register various kinds of data to be entered into said totalizers.

Such machines are usually constructed so that there are more denominational elements in the totalizer than are represented on the keyboard, thus allowing storage of a greater amount than may be entered into the machine in a single operation. Such extra denominational elements, termed "overflow" elements, are ordinarily adjacent the totalizer elements representing the highest denominational order on the keyboard, and data is entered into them by means of transfer mechanism from the next lower order totalizer elements. A differentially settable member is usually supplied for withdrawal of data from the overflow elements in total taking or reading operations. It is obvious that, if the totalizer elements are split by interrupting the transfer mechanism between two orders, in order that two kinds of data may be registered, only that section adjacent the overflow means may have the benefit thereof.

Therefore it is the main object of the invention to provide a machine having a split keyboard and split totalizer rows with means whereby amounts entered through either section thereof may be accumulated in excess of the amount that may be entered by the operator in one registering operation.

Another object of the invention is to provide, in a machine having a certain number of key bank registering sections and a single overflow registering section, means whereby the overflow registering section may be used to accumulate data entered by either of the sections of a split keyboard, in the same machine operation.

Another object of the invention is to provide means for entering, during the same machine operation, data from different sections of a split keyboard to individually mounted totalizers, each of said totalizers having an overflow element all of which overflow elements are located in the same registering bank which is provided with one differentially settable member for withdrawal of such overflow data.

Another object of the invention is to provide control mechanism whereby the operator is forced to cause data from the split keyboard to be entered into all the totalizers represented thereby in one registering operation but allowing data to be withdrawn from a selected one of the totalizers in one total taking operation.

Further objects of the invention will be pointed out in the following detailed description with reference to the annexed drawings.

A preferred form of an embodiment of the invention is shown in the annexed drawings.

Of said drawings:

Fig. 1 shows the keyboard of the machine in diagrammatic form.

Fig. 4 is an interrupted transversal section of the totalizer row II.

Fig. 5 is an interrupted transversal section of the totalizer row I.

Fig. 6 shows the totalizer row IV in section.

Fig. 7 is a side view of the key bank for selecting totalizers in row I.

Fig. 8 is a side view of the key bank for selecting totalizers in row II.

Fig. 9 is a diagrammatic view of the arrangement of the totalizers on their respective shafts.

Fig. 10 is a detail showing the method of linking corresponding control keys of adjacent key banks.

Figure 2:
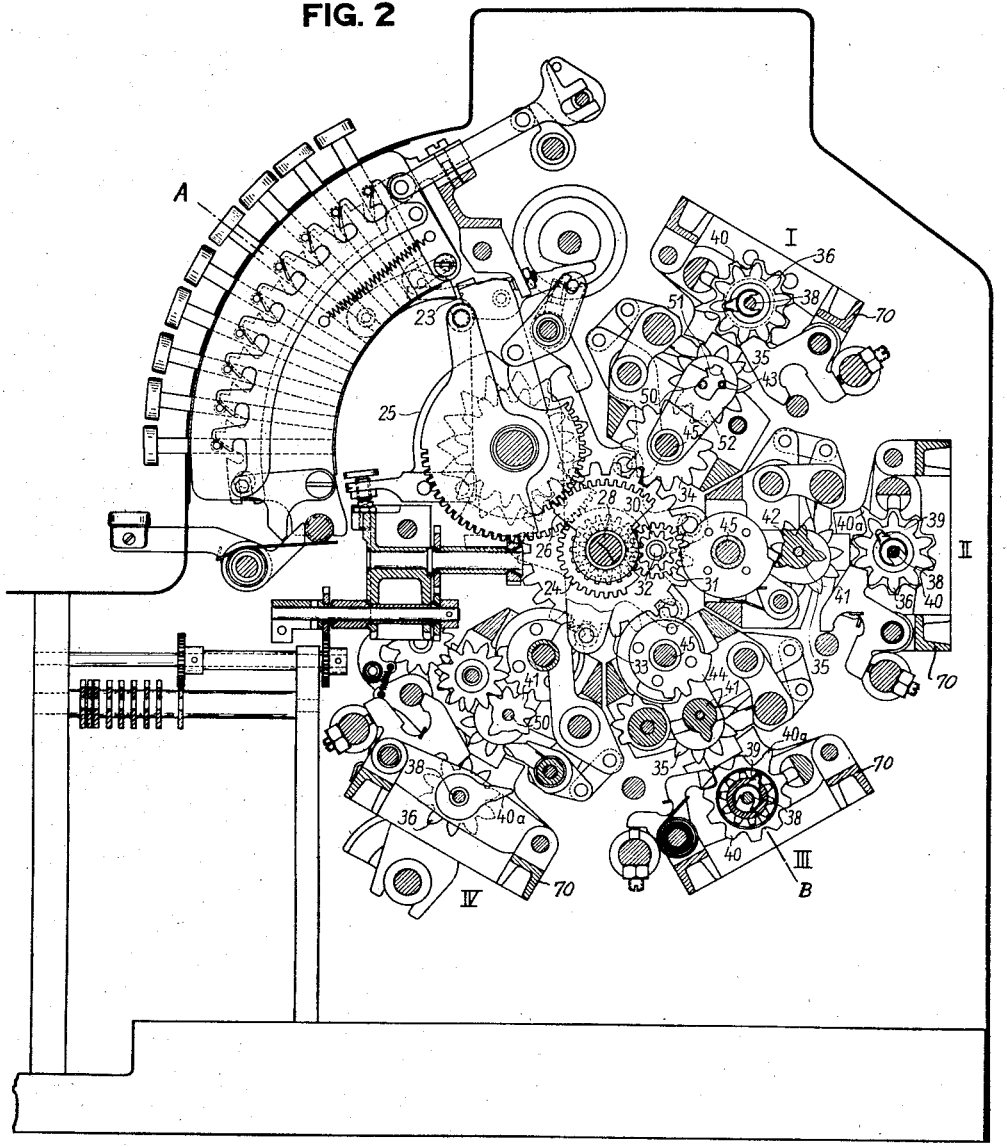
Fig. 2 is a cross section through the machine.

In order to use the same machine for simultaneously recording quantities and amounts, it is the general practice in the art to split the key board into a quantity key board and an amount key board. To conform to the keyboard, the totalizer rows also are split at the denominational order where the amount key board is separated from the quantity key board.

Normally, the accumulating capacity of the totalizers is higher by one denominational order than the setting up capacity of the key board. The extra denominational order in the totalizer is known as the overflow order. The denominational transfer device operates the overflow order wheels. When such totalizer rows are split, only one portion thereof is connected to the overflow wheels which, normally, are adjacent the left-hand portion of the totalizer rows, whereas the right-hand portion may accumulate not to exceed the maximum amount that may be set up on the keyboard and has only as many denominational order wheels as there are key banks in the associated portion of the key board. Without the addition of an overflow mechanism, such as supplied by this invention, the registering capacity of the latter section of the totalizer rows would soon be exhausted and the advantage sought by splitting up the totalizer rows would not be completely attained.

In applicant's machine, the overflow elements of the totalizer are all located on the left ends of their respective totalizer supporting shafts, the data being entered into them by transfer mechanism operated either by the totalizer elements of adjacent or non-adjacent denominational sections.

Each section of the split keyboard has its totalizer wheels mounted on an individual supporting shaft, the overflow pinion for the totalizer associated with the right section of the keyboard being mounted on the extreme left end of its supporting shaft, means being supplied for lateral transmission of the action of the transfer mechanism.

By this arrangement, both lines of totalizers may be brought into engagement with their respective differential racks without interference. As the overflow bank is not key-controlled, its differential will be inoperative on adding operations and the overflow wheels on the two lines of totalizers will not be disturbed in an item entering operation.

Therefore, in the machine illustrated, having nine key-controlled banks split into a right section of five banks and a left section of four banks, the tenth bank or overflow bank serving both sections of the keyboard provides the right section with a total accumulating capacity of six denominations and the left section with a total accumulating capacity of five denominations.

The invention is shown and described as applied to a machine of the type described in U. S. Letters Patents No. 2,057,438 issued to K. A. Lehmann et al. and No. 1,899,455 issued to Ernst Breitling. Therefore only a brief description of the machine is given herein whilst reference may be had to the above Letters Patent for a more detailed specification.

A machine provided with the features of the invention may be used in dairies and like trades where the various products are handed over to retail dealers and the latter are charged for the merchandise bought. In such transactions, the quantities and the prices of the articles sold are to be registered in the machine. In order to simultaneously register both the price and quantity in a single machine operation, the keyboard of the machine is split up into two sections, one thereof comprising the amount key banks 10 (Fig. 1) and the other four comprising the quantity key banks 11. Consequently, the totalizer rows are ended at the denominational order separating the said two sections, in a manner to be described later, so as to establish a row of quantity and a row of amount totalizers.

For the selection of the totalizers a plurality of key banks are provided. The keys 151 operating two key banks and the keys 301 arranged in rows are for selecting totalizers associated with the article sold, whereas the third key bank contains special keys 401, 402 for various types of transactions.

The key caps 151 are not attached to normal keys but are carried by links 161, each such link connecting the corresponding keys 101 and 201. The links 161 are pivotally pinned to the stems of keys 101 and engage notches on the stem of keys 201 under the action of spring actuated pawls 162 (Fig. 10), so that the said links may be removed from the path of the total lever 1 when necessary. The pairs of keys so connected to one another are assigned to the type of goods indicated on the key caps 151 and, upon depressing a key cap 151, the respective blind keys 101 and 201 are operated to select a totalizer in the quantity totalizer row I (Fig. 5) and the corresponding totalizer in the amount totalizer row II (Fig. 4) respectively.

The keys 201 are also machine release keys, and in order to enforce the proper sequence of operation of the two blind keys upon depressing a key cap 151, the stem of key 101 is caused to be pushed in prior to the stem of key 201 which key releases the machine for operation, by a suitable key locking mechanism shown in Figs. 7 and 8. The pins 112 projecting from the keys 101 cooperate with inclined surfaces of a slidable key detent 120, so that, upon depression of a key 101, the said detent is moved upwardly. By means of a link 121, detent 120 is connected to an arm 122 fast on the left end of a sleeve 123 on the shaft 130. Arm 124, connected by a link 125 to a locking detent 126, is fast on the right end of the sleeve 123. The detent 126 has locking surfaces lying under projecting pins 212 on the release keys 201 to lock them normally against depression. If a key 151 is depressed, only the stem of the respective key 101 can be pushed in as the stem of key 201 is held locked by the locking detent 126. The key detent 120 is moved up by means of the stem of key 101 moving down, thus causing detent 126 to be raised so that it releases the key pins 212. If the pressure on key 151 continues, the stem of the respective key 201 will be pushed in and the machine released for operation. This assures that both the quantity and amount totalizer rows are selected.

The commodity keys 301 (Fig. 1) are also release or motor keys and select the quantity and the amount totalizers of the normally split totalizer row III which are assigned to different sorts of goods.

The merchandise sold in a given transaction cannot be registered by merely depressing a commodity key 151 or 301, but, to this end, first of all, the charge key 401 selecting the totalizer of row IV which totalizer accumulates the amounts of all goods delivered, has to be depressed.

The keys 402 of this same bank serve to register various other transactions, for instance, expenses and repayments, to release the machine without a commodity key being depressed and to distribute the amounts onto the proper totalizers of row IV. Also, an item total key 403 is provided.

These features, however, are not of interest in describing this invention. This case is only concerned with the manner in which the bank of overflow order wheels are used partly for the quantity totalizers and partly for the amount totalizers.

If a certain quantity of goods is handed over to the retail dealer, such transaction is registered as follows:

In a special numbering device (not shown) the number assigned to the respective retail dealer and then the quantity sold and the price are set up on the keys 11 and 10 respectively. Then the charge key 401 is depressed and the machine released by a commodity key 151 or 301 respectively. If, for instance, a key 301 has been depressed and thus has released the machine for operation, first of all, the totalizers of the rows III and IV (Figs. 3 and 6) controlled by the operated keys 301 and 401, are selected for engagement with the differential mechanism.

This is effected, in a manner well known in the art but not shown here, in that the rider shafts 38 (Figs. 2 and 3) of these totalizer rows are shifted in accordance with the depressed totalizer selecting keys so that their teeth 39 couple the selected adding wheels 40 with the driving pinions 36. If, for instance, the third key 301—counting down from the top—is depressed, in each denominational order of the totalizer row III the third adding wheel from the right-hand side is coupled with its appertaining pinion 36, whereas in row IV, because key 401 is depressed, the first adding wheel of each denominational order is coupled with the appertaining pinion 36. Simultaneously with the selection, in each denominational order the pinions 36 are adjusted by means of known differential devices 23—33 and the intermediate wheels 34, 35 in accordance with the value of the depressed amount or quantity key respectively. Then the totalizer rows III and IV are carried into engagement with the differential mechanism by their supporting frames 70, their pinions 36 meshing with the toothed intermediate wheels 35.

Thereupon the differential devices are returned to home position, the coupled adding wheels being clockwisely rotated by a number of units corresponding with the value of the depressed keys 10 and 11, i. e., the values set up on the keyboard are transferred to the adding wheels. If, at this time, an adding wheel passes from "9" to "0" the tens carry tooth 40a (Fig. 2) of the respective adding wheel rotates the associated tens carry pinion 41 through 45 degrees, whereby its tooth 42 comes into the reach of an actuating disk 44 fast on shaft 45. After amount transferring is thus conditioned, shaft 45 carrying the actuating disks 44 helically disposed thereon is clockwisely rotated, whereby the previously conditioned tens carry pinion 41 is additionally rotated through 90 degrees. A tappet 43 on the tens carry pinion 41 engages a suitably shaped recess 51 of a carrier 52 loosely mounted on shaft 45 and carrying a hub for the toothed intermediate wheel 35 of the next higher denominational order. During the first part-motion of the tens carry pinion, tappet 43 moves idly in the recess of the carrier 52. During the second part-motion of the pinion, tappet 43 counter-clockwisely rocks the carrier 52 through a certain angle around shaft 45. At this time, the intermediate wheel 35 rolls down the intermediate wheel 34 held at rest and rotates thereby the pinion 36 in mesh therewith, by which the adding wheel 40 coupled with it, is tripped by one unit.

The tens transfer device adapted for a machine as specified, is shown and described in U. S. patent application, filed October 5, 1935, Serial No. 43,731 of Ernst Breitling, which issued on July 18, 1939, as Patent No. 2,166,459, to which reference is made for a more detailed description. Herein is described only as much as necessary for an understanding of this feature of the invention.

Figure 3:
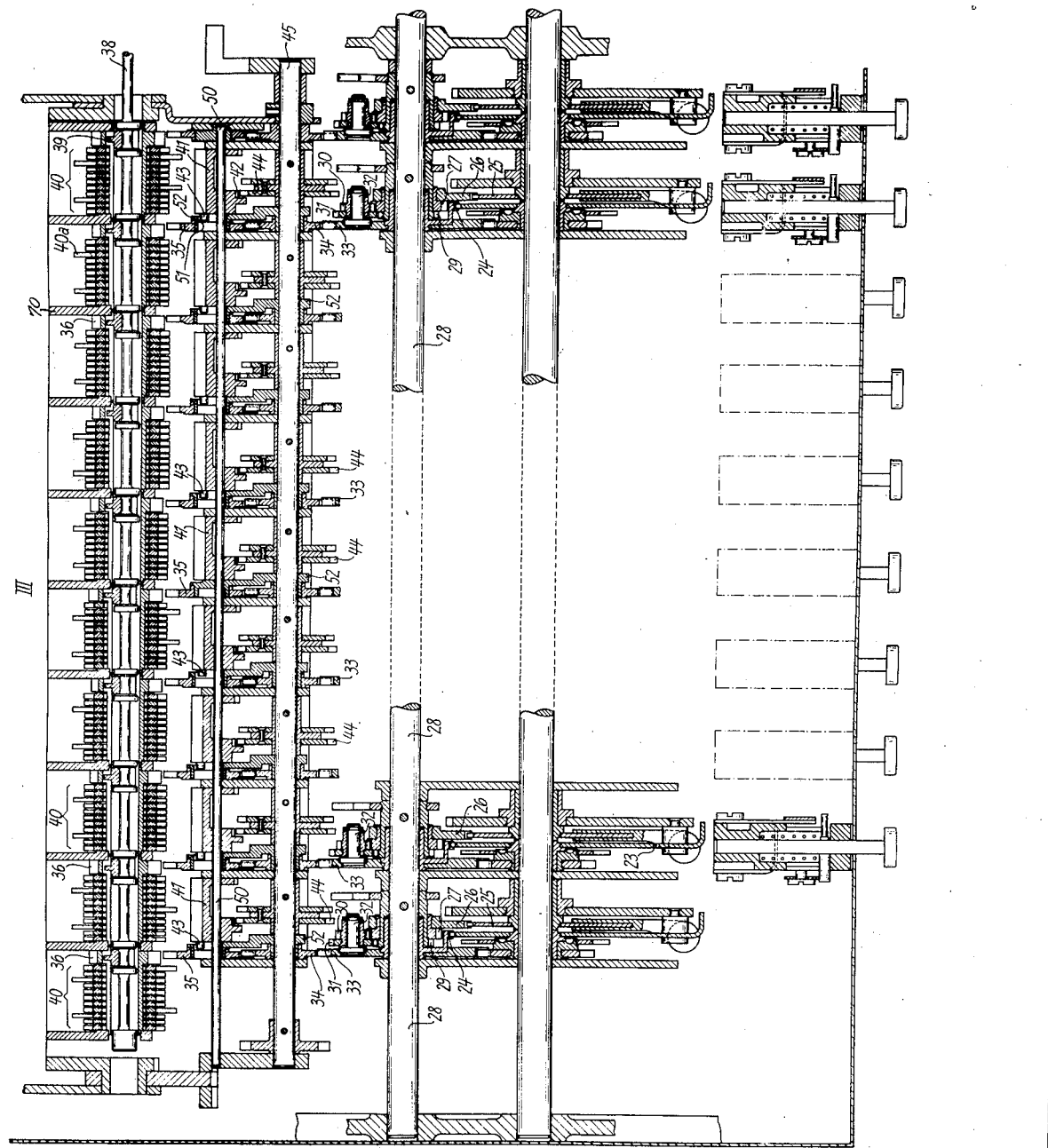
Fig. 3 is a transversal section of the machine through the totalizer row III along line A—B of Fig. 2, with part broken away.

Tens carrying to the next higher order caused by the adding wheels passing from "9" to "0," is effected in the same manner between each of the denominational orders, except where interrupted between the fifth and sixth orders in those rows having amount wheels and quantity wheels. Tens carrying is prohibited by eliminating tappet 43 from the pinion 41 of the fifth order wheel, and causing the intermediate wheel carrier 52 of the sixth order to be fixed in normal position (Fig. 3). This causes the totalizers controlled by the amount keys 10, to comprise only the first five denominations, counting from the right end, whereas the totalizer group under control of the four quantity key banks starts with the sixth denominational order. Thus, each totalizer row is split up into right-hand and left-hand groups of amount and quantity totalizers respectively. However, the number and arrangement of the totalizer wheels and the use of the overflow order wheels is varied in the individual rows.

In the totalizer row III (Fig. 3) each decimal order comprises eleven adding wheels under control of the commodity keys 301. The first five denominational order groups of wheels, controlled by the amount key banks, constitute eleven amount totalizers, each having a capacity of five denominational orders, each of the eleven totalizers representing a sort of goods. In a similar manner, the last four denominational order groups of wheels are controlled by the quantity key banks, and constitute eleven quantity totalizers to represent the same sorts of goods as the amount totalizers. The quantity totalizers have groups of additional denominational order wheels, since, by means of the transfer mechanism, the passing from "9" to "0" of a wheel of the fourth order causes a unit to be added to the corresponding overflow order wheel.

The totalizer row IV (Fig. 6) under control of the special keys 401, 402, 403 does not contain the totalizer groups representing quantity, but does contain five amount groups supplemented by the overflow wheels, which are on the extreme left end of the shaft 38, the actuation of which is accomplished by pinning the tens carry pinion 41 of the fifth order and the pinion mounted before the overflow order wheel to shaft 50. Thus, whenever the fifth order wheel passes from "9" to "0," shaft 50 is rocked, conditioning the transfer mechanism to add one unit into the selected overflow totalizer when the actuating disks 44 are operated. Consequently, this totalizer row consists of totalizers of a six denominational order capacity for the transactions indicated on the keys 401 and 402 and the item totalizer under control of key 403.

In the totalizer row I (Fig .5), which is under control of the keys 101, the first five denominational orders on the right are omitted. However, the four denominational orders controlled by the quantity keys 11, comprise eleven adding wheels 40 each. The overflow wheels of this row are normally connected to the highest of the four key-controlled denominational order wheels, so that this row has eleven quantity totalizers each having five denominational order wheels arranged to be controlled by the keys 101, to accumulate the quantities of the sorts of goods indicated on the key checks 151.

There are five denominational orders in row II (Fig. 4) controlled by the blind keys 201, each having eleven adding wheels. The fifth denominational order wheels are—as is the case in row IV—connected, by means of the two pinions 41 pinned to shaft 50, to the overflow order wheels of this row, so that the registering capacity of this row is increased to six denominations to accumulate the value of goods indicated on the key checks 151. No adding wheels are provided for the four denominational orders controlled by the quantity keys.

If in a machine operation the quantity and the amount of the selected article indicated on the key 151, is to be recorded, first of all, the respective quantity keys and amount keys, the charge key 401 and the commodity key 151 are to be depressed. Upon depression of the key 151, the keys 101 and 201 are pushed in as above mentioned, stem 201 releasing the machine for operation. At the beginning of the machine operation, the rider shafts 38 of the totalizer rows I and II are shifted under control of keys 101 and 201, so that their teeth 39 couple the selected adding wheels 40 of these rows with the pertaining pinions 36. In the row IV, the charge totalizer selected by key 401, is selected in the same manner. Then these three totalizer rows are carried into engagement, their pinions 36 meshing with the toothed intermediate wheels 35 adjusted in the meantime by the differential devices. On return of the differential devices to home position, the quantity set up is transferred to the adding wheels of row I, this row containing only quantity totalizers. The overflow order wheels of this row are connected with the quantity totalizer wheels, so that the quantity set up is transferred to a quantity totalizer with a capacity of five denominational orders. At the same time, the amount set up is transferred to the amount totalizers selected in rows II and IV respectively. The overflow order wheels of these two rows, as already described, gives these totalizers a registering capacity of six denominations.

Due to this arrangement, the quantity and the amount set up are transferred simultaneously to their respective totalizers in different rows each having allotted thereto an overflow order wheel.

Applicant's invention, therefore, permits the use of a machine ten denominational sections wide for registering, in one operation, data that heretofore has required a machine eleven denominational sections wide. The principle involved in the invention is not restricted to the particular number of denominational sections shown, but is obviously applicable to machines having a greater or lesser number of denominational units, or a machine whose keyboard is split at a different place.

While the form of mechanism herein shown and described is admirably adapted to fulfill the objects primarily stated, it is to be understood that it is not intended to confine the invention to the one form or embodiment herein disclosed for it is susceptible of embodiment in various forms all coming within the scope of the claims which follow.

What is claimed as new is:

1. In a machine of the class described adapted to enter amounts of diverse kinds into separate totalizers during the same machine operation, the combination of a plurality of totalizers; a plurality of groups of differentially settable members each group representing a kind of amount and the individual members thereof representing denominations; means for individually mounting the totalizers so that a totalizer representing a kind of amount will be cooperable with the group of differentially settable members representing the same kind of amount and said mounting allowing the selective separate cooperation of any of the totalizers with its associated group of differentially settable members; means to control the differentially settable members to enter selected amounts into selected totalizers; an overflow wheel for each totalizer; the differentially settable members also cooperating with the totalizers to withdraw amounts selectively from their related totalizers; and a single differentially settable member common to all the totalizers for withdrawing an amount from that overflow wheel associated with the selected totalizer from which an amount is to be withdrawn by the differentially settable members.

2. In a machine of the class described operable to enter amounts of different kinds in separate totalizers in a single machine operation and to clear said totalizers, the combination of a keyboard comprising a plurality of sections, each section containing denominational groups of keys operable to set up one of said kinds of amounts; a plurality of groups of differential mechanisms, one group for each section of the keyboard, and each group of differential mechanisms being related to one of said kinds of amounts, containing a denominational member for each denominational group of keys in the related section of the keyboard and controllable thereby in amount-entering operations; a plurality of totalizers, one for each kind of amount, and each totalizer containing differentially operable denominational elements operated in amount-entering and amount-clearing operations by the group of differential members related to the same kind of amount; an overflow denominational element in each totalizer; means operated under control of the differentially operable denominational element of the highest denomination in each totalizer to enter a unit in the overflow element for that totalizer each time the capacity of the differentially operable denominational elements as a whole is exceeded in amount-entering operations; and an additional differential mechanism containing a denominational member for operating the overflow elements of all of said totalizers to clear amounts therefrom, said additional differential mechanism being selectively operable with the various other groups of differential mechanisms to clear the totalizers in amount-clearing operations.

3. In a machine of the class described having two groups of amount key banks operable to set up different kinds of data, the combination of a plurality of differential mechanisms, one for each key bank and controllable thereby; an additional differential mechanism; and two totalizers, one for accumulating each of the different kinds of data, each totalizer having differentially settable elements and an overflow element, each of the differentially settable elements of the two totalizers being cooperable with a different one of the plurality of differential mechanisms to be operated thereby and the overflow elements of both totalizers cooperable with the additional differential mechanism.

4. In a machine of the class described adapted to enter amounts of diverse kinds into separate totalizers during the same machine operation and to clear said totalizers, the combination of a plurality of totalizers each comprising a plurality of denominational elements differentially operable to receive amounts and an overflow denominational element actuated a unit each time the amount in the denominational elements, when considered as a whole, exceeds their capacity; a plurality of groups of differentially operable members for entering and clearing amounts from said totalizers, each group being related to one of said totalizers representing diverse kinds of amounts and the individual members of the group representing denominations corresponding to the denominational elements of its related totalizer; transfer means between each of the denominational elements of the totalizers and between the highest denominational order elements and the overflow denominational elements for entering a unit in the next higher denominational element each time the lower denominational element exceeds its capacity; an additional differentially operable member for clearing amounts from the overflow elements of any of said totalizers; means for supporting said groups of differentially operable members and said additional differentially operable member side by side in the machine; and supporting means for said totalizers, the supporting means for each of said totalizers carrying the denominational elements in proper side position in the machine to cooperate with their related group of members and carrying the overflow elements in position to cooperate with the additional differentially operable member; said additional member therefore being operable to clear amounts from the overflow element of any of said totalizers when the group of differentially operable members related to that totalizer is clearing the denominational elements thereof.

5. In a machine of the class described, the combination of a plurality of differentially operable members; a pair of totalizers each containing a plurality of denominational elements; and means for supporting the totalizers with a certain element of both totalizers substantially in the plane of the same differential member and each of the remaining elements of both totalizers substantially in the plane of a different one of the remaining differential members.

6. In a machine of the class described, a pair of totalizers each containing denominational amount entry receiving devices, an overflow device, and transfer mechanism for entering a unit in a higher denominational element when the next lower denominational element exceeds its capacity and for entering values in the overflow device; a plurality of differentially operable members; and means for supporting said totalizers with the amount entry receiving devices thereof each cooperating with a separate differential member and the overflow devices of both totalizers cooperating with a single differential member.

HELMUT GELLER.